Sept. 17, 1968 G. J. CULLER ET AL 3,402,395

DATA COMPRESSION AND DISPLAY SYSTEM

Filed Feb. 15, 1965 4 Sheets-Sheet 1

INVENTORS
GLEN J. CULLER
ROLAND F. BRYAN
BY
Arthur Frederick
ATTORNEY

| SEQU. | ORIGIN | ERASE | VECTOR |
|---|---|---|---|
| 1 | 1=ORIGIN + ERASE | | 0=VECTOR |
| 2 | 0=ORIGIN | 1=ERASE | — |
| 3 | X COORDINATE | SELECTION CODE | 1ST VECTOR |
| 4 | | | |
| 5 | | | |
| 6 | | | |
| 7 | | | 2ND VECTOR |
| 8 | | | |
| 9 | | | |
| 10 | | | |
| 11 | | | 3RD VECTOR |
| 12 | | | |
| 13 | Y COORDINATE | | |
| 14 | | | |
| 15 | | | 4TH VECTOR |
| 16 | | | |
| 17 | | | |
| 18 | | | |
| 19 | | | 5TH VECTOR |
| 20 | | | |
| 21 | | | |
| 22 | | | |
| 23 | SELECTION CODE | | 6TH VECTOR |
| 24 | | | |
| 25 | | | |
| 26 | | | |
| 27 | | | — |
| 28 | — | — | — |

INVENTORS
GLEN J. CULLER
ROLAND F. BRYAN
BY
Arthur Frielich
ATTORNEY

DATA COMPRESSION AND DISPLAY SYSTEM

Filed Feb. 15, 1965 4 Sheets-Sheet 3

INVENTORS
GLEN J. CULLER
ROLAND F. BRYAN
BY
Arthur Freilich
ATTORNEY

Sept. 17, 1968 G. J. CULLER ETAL 3,402,395

DATA COMPRESSION AND DISPLAY SYSTEM

Filed Feb. 15, 1965 4 Sheets-Sheet 4

INVENTORS
GLEN J. CULLER
ROLAND F. BRYAN
BY
Arthur Friedrich
ATTORNEY

United States Patent Office 3,402,395
Patented Sept. 17, 1968

3,402,395

DATA COMPRESSION AND DISPLAY SYSTEM

Glen J. Culler, Santa Barbara, and Roland F. Bryan, Chatsworth, Calif., assignors to The Bunker-Ramo Corporation, Stamford, Conn., a corporation of Delaware Filed Feb. 15, 1965, Ser. No. 432,585
13 Claims. (Cl. 340—172.5)

ABSTRACT OF THE DISCLOSURE

A system including display equipment responsive to digitally represented data for presenting a visual display of such data on a display point matrix such as is provided by a cathode ray tube. The system incorporates means for defining matrix points to be displayed in terms of their orientation with respect to previously displayed points rather than in terms of the point's absolute position in the matrix. That is, each new point to be displayed is defined in terms of its position in a sub-matrix, the position of the sub-matrix in the larger matrix being defined by the absolute position in the matrix of the previously displayed point. By representing data in this fashion, a considerably narrower bandwidth channel can be used for communication between a data source and the display equipment.

This invention relates generally to improvements in data compression and display apparatus and finds particular utility in multi-user computer systems wherein user stations are located remote from a central computer.

In a paper, entitled "On-Line Computations and Faster Information Processing," delivered at the March 1963 Pacific Computer Conference, Drs. G. J. Culler and B. D. Fried discussed an on-line computer system particularly adapted for use by scientists or mathematicians to enable them to investigate in depth certain types of problems which are not amenable to solution by conventional computer procedures. More particularly, their discussion was directed to methods and apparatus for improving man-machine communication so that the computer can effectively assist the man in those jobs (requiring intuition, judgment, evaluation) for which man is best suited. Systems of this type have been referred to as "on-line" computer systems. The development of systems of this type is significant because of the ineffectiveness of off-line systems for solving certain types of problems. More particularly, significant, if not intolerable, difficulties have been encountered in attempting to use an off-line computer system to solve mathematical research type problems whose structure is, for the most part, unknown and frequently surprising. These difficulties result from the fact that it is notoriously difficult to develop a satisfactory computer program if one does not understand, a priori, the general character of the solution. In fact, information about the general character of the solution is often what a research scientist really wants, as distinguished from the quantitative details of the solution. Although it is possible in principle to perform experimental mathematics with off-line computing systems by starting with some promising method of solution together with the associated program therefor and modify either the method or the program in the light of the initial results obtained, efforts along this line have not provided satisfactory results due to the time lapse encountered between the selection of a new method, or the modification of the old one, and the subsequent return of information from the computer. This time lapse in off-line systems is in most cases so great as to make this approach practically infeasible.

In view of the recognized ineffectiveness of off-line computer systems for the solution of certain types of problems, the above-cited paper discloses a system which permits a scientist user to manually direct operations of the computer and to immediately be made aware of results derived from such operations so as to then enable him to direct further operations in the light of those results. Two features of the disclosed system are particularly significant. Initially, provision is made for the scientist to construct computer programs at a keyboard which programs can then be initiated in response to the actuation of a single key. The second significant feature of the system constitutes its ability to perform operations on functions, rather than individual numerical quantities, and present graphical displays representing the functions.

Although systems of the type described in the above-cited paper have to date been put to only limited use, they have proven to be highly effective and give promise of becoming a very essential tool for users in many diverse fields of endeavor. Despite the effectiveness of the such systems, the dedication of a computer to a single user represents an extravagant use of the computer's time inasmuch as, in most instances, the computer is able to react and provide results faster than the user can utilize them. In view of this, it is an object of the present invention to provide a system in which a single computer can simultaneously serve several users on a time sharing basis.

As noted, the above-cited paper proposes a system in which operations are performed on functions, which functions are graphically displayed to the user, preferably in the form of continuous curves. Heretofore, a preferred method of displaying continuous curves was to represent each function point by a digital word which was coupled by digital-to-analog converter means to the deflection means of a cathode ray tube. Thus, for a cathode ray tube defining a matrix of M x N where $$M=N=1024$$

display points, ten binary digits (bits) are required to represent the X-coordinate and ten bits are similarly required to represent the Y-coordinate of each point to be displayed. Since it is desirable that each function usually consist of upwards of 100 points, a rather large amount of data must be provided to the cathode ray tube to enable it to display the function. Where such data is transmitted to the cathode ray tube from the computer via a telephone line or such, the bandwidth limit of the telephone line usually either increases the waiting time for each user or effectively reduces the number of users which can be on line at any one time.

In view of this, it is an object of the present invention to provide a method and apparatus for digitally representing curves to be displayed in a manner which enables them to be more rapidly and inexpensively transmitted over a communication channel such as a telephone line.

Briefly, in accordance with one aspect of the present invention, information defining the shape of a curve to be displayed is represented in terms of the incremental distance of most points from preceding points rather than in terms of the point's absolute position in a display matrix.

More particularly, rather than creating a curve by digitally defining the absolute position in an M x N matrix of each of the points thereof, the invention herein is based on the recognition that less information and lower priced equipment can be employed if an origin point is absolutely defined and subsequent points are defined in terms of their incremental distance from the immediately preceding point. Thus, if an origin point is initially defined by 20 bits (assuming the exemplary 1024 x 1024 matrix previously mentioned), a subsequent point can be defined, in fewer bits if adjacent function points are reasonably close. For example, if each function point is spaced no more than two units in the matrix in either the X- or Y-direction from a preceding point, a subsequent point can be defined in only four bits, two bits for the X-coordinate and two bits for the Y-coordinate. Inasmuch as the scientist or mathematician usually deals with curves involving natural phenomena in which changes are gradual, this limitation is not very restrictive as a practical matter. In any event, so long as one is willing to tolerate any restriction whereby a subsequent point is defined in terms of some sub-area of the entire display matrix around a preceding point, rather than in terms of its absolute position in the display matrix, some degree of economy is introduced. That is, the sub-area can be an M' x N' matrix where M>M' and N>N'.

In the preferred embodiment of the present invention, a particularly useful sub-area of the entire display matrix is chosen; namely a 5 x 5 matrix with the origin or the preceding point at the center. By restricting subsequent display points to the 16 points on the perimeter of this 5 x 5 matrix, only four bits are required to define the position of a subsequent point. These four bits can be used to modify a digitally expressed absolute position held in a display register.

In many instances, it is not necessary to define the position of points so closely that the points as displayed actually touch one another. That is, most any curve is usually comprised of a great many small straight line segments strung end to end. Consequently, several prior art systems employ line drawing equipment to draw straight lines between two terminal points. The provision of such equipment is very expensive however and thus may make it impractical for a system of the type under discussion to be employed as a scientific tool.

Thus, in accordance with a further aspect of the invention, lines or vectors are drawn by modifying the digitally expressed absolute position of a point by incrementing, thus moving a cathode ray tube beam in corresponding increments to effectively draw a short vector.

An additional feature of the preferred embodiment of the invention involves inserting a tag bit in a shift register prior to loading data bits therein to thus provide an indication as to when the register is full without the necessity of providing a counter for this purpose.

It is pointed out that although the display techniques introduced herein are particularly suitable for drawing curves useful to the scientist or mathematician, they can also be used to generate any other pattern including alphanumeric and arbitrary characters.

The novel features that are considered characteristic of this invention are set forth with particularity in the appended claims. The invention itself both as to its organization and method of operation as well as additional objects and advantages thereof, will best be understood from the following description when read in connection with the accompanying drawings, in which:

Figure 1:
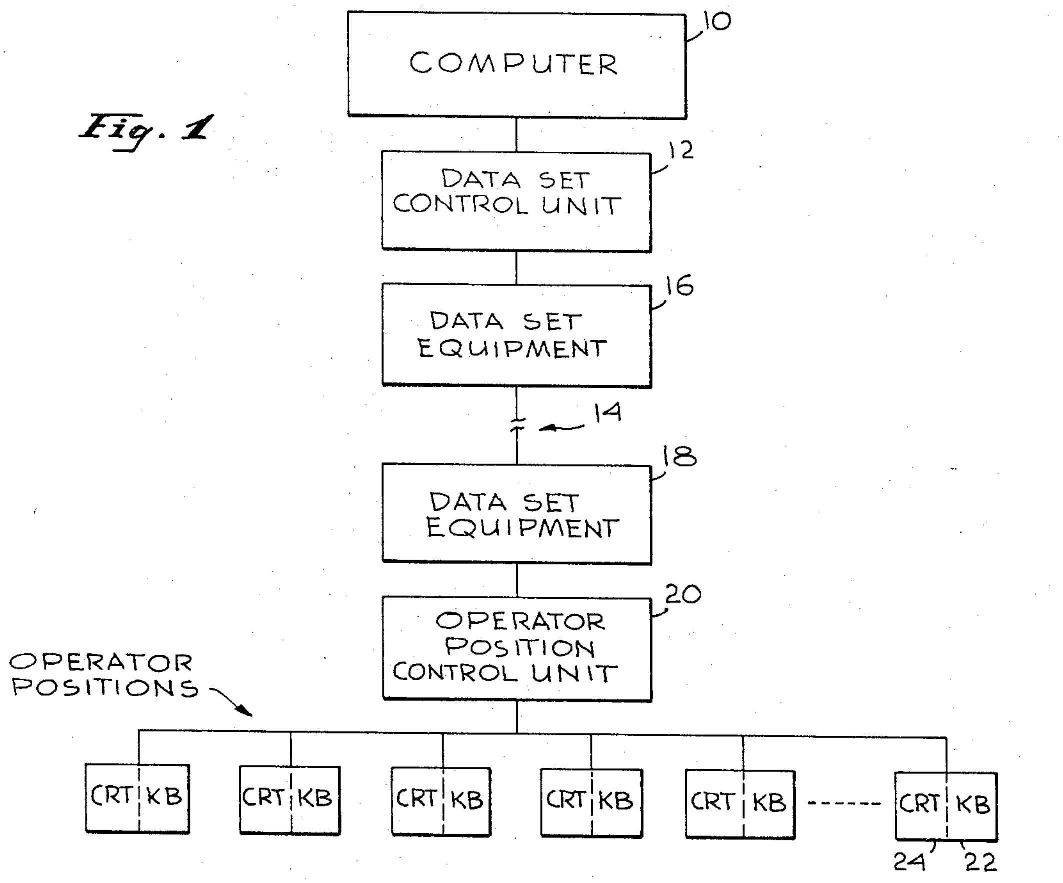
FIGURE 1 is a block diagram of a multi-user on-line computer system in accordance with the invention.
Figures 5A, 5B:
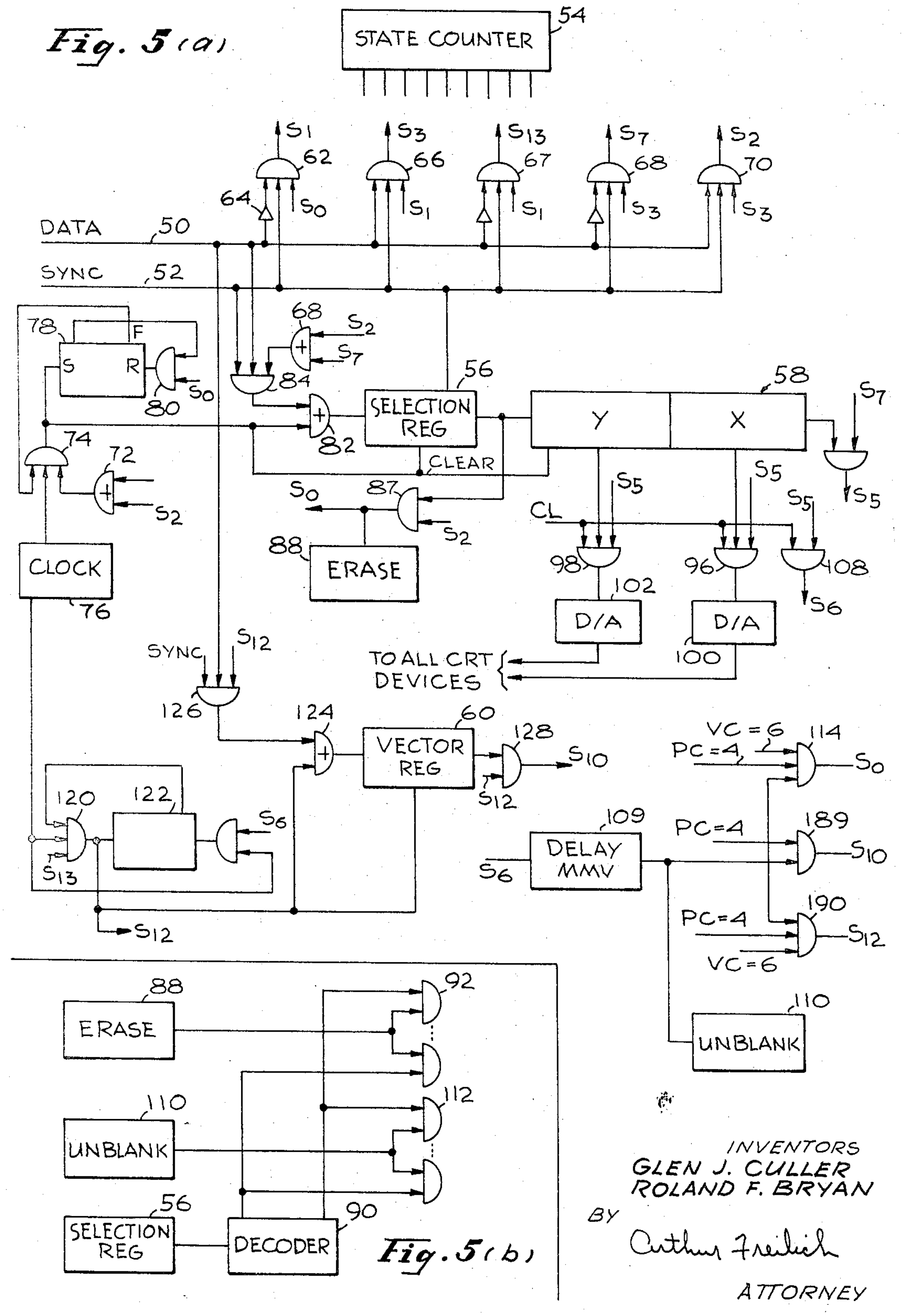
Figure 5:
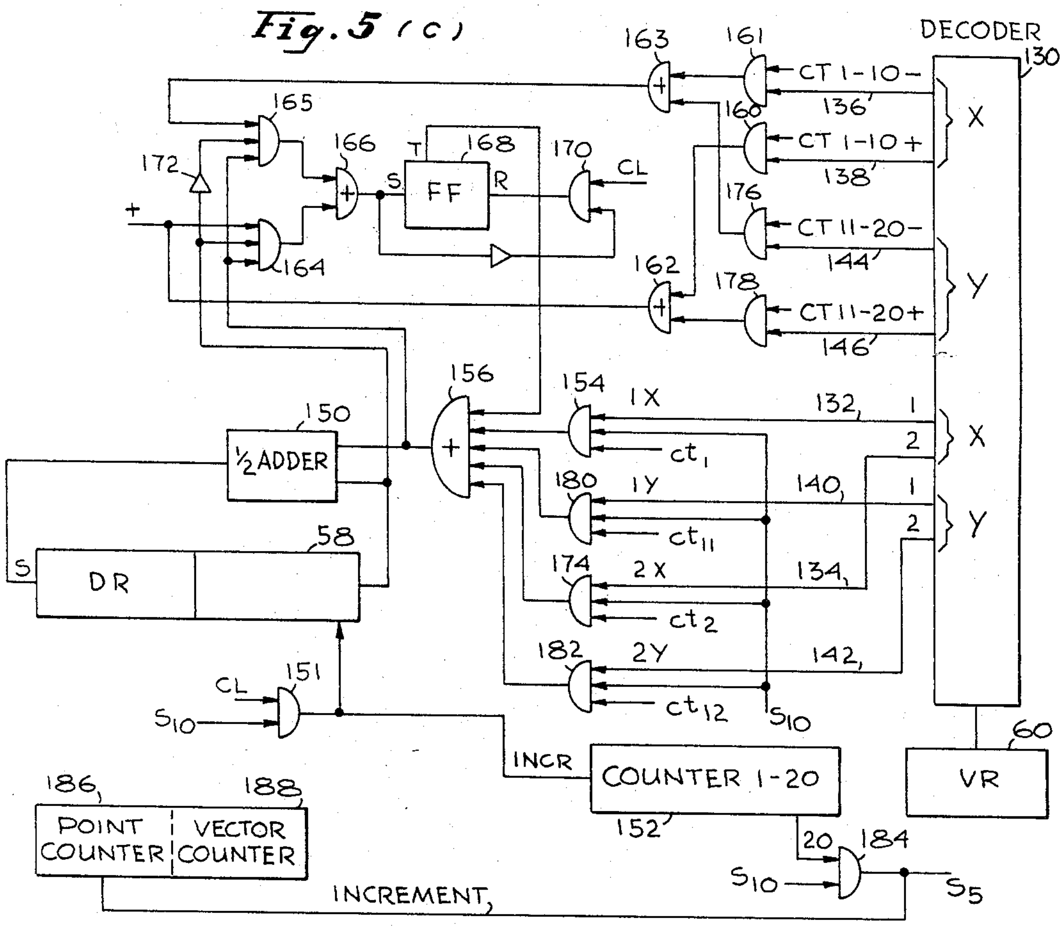
Figure 5:
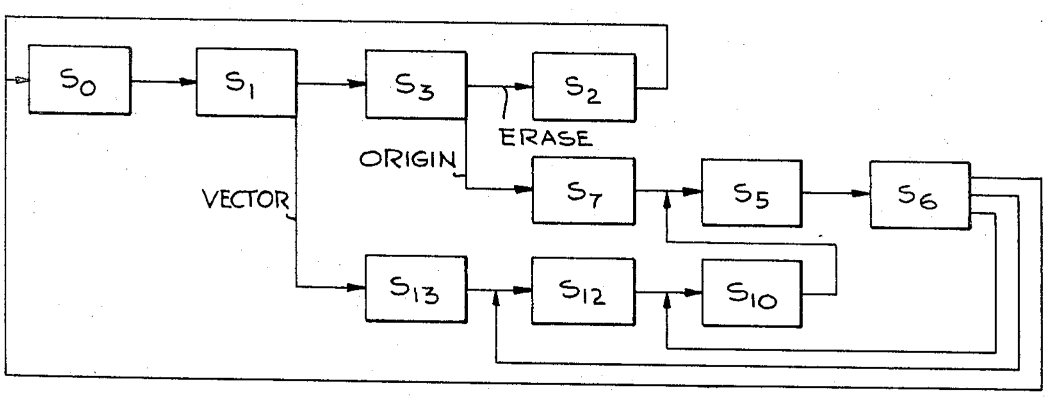

FIGS. 5(*a*) through (*c*) comprise block diagrams illustrating display portions of the operator position control unit of FIG. 1; and FIG. 5(*d*) is a flow chart illustrating the sequence of states defined by the state counter of FIG. 5(*a*).

Attention is now called to FIG. 1 of the drawings which comprises a block diagram of a multi-user on-line computer system in which the invention can be advantageously employed. The system of FIG. 1 includes a general purpose digital computer 10 which is coupled to a data set control unit 12. The data set control unit 12 in turn is connected to telephone lines 14 through commercially available data set equipment 16. Data set equipment 18 is connected to a second end of the telephone lines 14 and couples the telephone lines to an operator position control unit 20. The control unit 20 in turn is connected to each of a plurality of operator positions or stations, each station including a manually operable keyboard 22 and a display means, preferably in the form of a cathode ray tube device 24.

The plurality of operator positions can be located throughout an industrial or university research center for example, which center can be situated many miles from the location of the computer 10. In the operation of the system of FIG. 1, each operator position will be available to a different user. Each user is able to input data to the computer 10 via the keyboard 22 and in turn the computer is able to respond to the user's requests and output data to his operator position in the form of graphical displays presented on the cathode ray tube device 24. The operator position control unit 20 functions to sequentially respond to keyboard signals coming from each of the various operator positions. Although a priority system could be utilized to give certain operator positions priority over others in the event of virtually simultaneous activity, no such priority system will be considered herein. Rather, as will be better understood from what shall be said hereinafter, the control unit 20 will examine each operator position in sequence and respond to any keys which have been actuated.

As indicated in the aforecited Pacific Computer Conference paper, it is desirable that an on-line computer system which is to be useful to the research scientist, have the outward capability of operating on functions rather than individual numerical quantities. Functions of two variables can be represented as a curve in the XY plane which curve contains a plurality of points each having a certain X or abscissa value and a certain Y or ordinate value.

For example, consider the function represented by the entries in Table I below:

TABLE I

| X | Y | X | Y | X | Y |
|---|---|---|---|---|---|
| 5.0 | 1700 | 6.4 | 1740 | 7.8 | 1700 |
| 5.2 | 1780 | 6.6 | 1660 | 8.0 | 1620 |
| 5.4 | 1780 | 6.8 | 1660 | 8.2 | 1620 |
| 5.6 | 1780 | 7.0 | 1660 | 8.4 | 1620 |
| 5.8 | 1800 | 7.2 | 1680 | 8.6 | 1640 |
| 6.0 | 1820 | 7.4 | 1700 | 8.8 | 1640 |
| 6.2 | 1780 | 7.6 | 1780 | 9.0 | 1640 |

Figure 2:
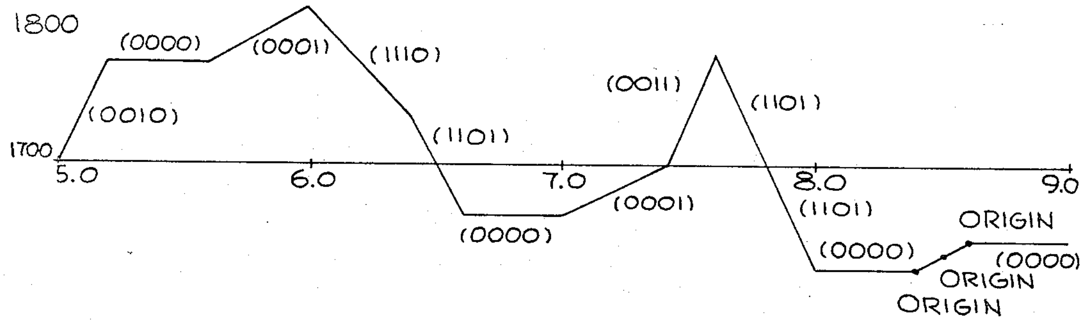
FIG. 2 illustrates a curve representing an arbitrarily selected function.

Table I represents an arbitrarily selected function expressing the relationship between two variables. FIG. 2 illustrates this function plotted in the XY plane. Functions of two or more variables are constantly being considered by a research scientist in the analysis of various problems. In order to facilitate this analysis, it is exceedingly helpful for the scientist to have the function presented to him in a graphical manner as shown in FIG. 2 since various characteristics of the function can be very revealing to a skilled scientist. More particularly, the graphical presentation of a function permits a scientist to more easily pursue trial and error solutions, exercise his intuition, etc. As a very basic example, not illustrated in FIG. 2, the appearance of a discontinuity or a recurring pattern in a function can be very meaningful to a skilled person.

The values in Table I can be stored in the memory of the computer 10 after, for example, being derived as a result of operations performed on two other functions. For example, the function represented in Table I can comprise the product of two other functions.

According to conventional display techniques, in order to display the curve of FIG. 2 on a cathode ray tube device 24, the values of Table I can be converted to deflection voltages for positioning the cathode ray tube beam. For example, let it be assumed that the cathode ray tube device 24 defines a 1024 x 1024 matrix of display ponits. The computer 10 by determining the range of its abscissa values (herein $\Delta X=9.0-5.0=4.0$) can convert each of the actual X values to a corresponding point in the matrix of display points. Similarly, the computer can convert each Y value from Table I into an ordinate value corresponding to one of 1024 positions in the display matrix. Table II lists the abscissa and ordinate values which can be digitally represented and applied to the deflection means of a cathode ray tube device through a digital-to-analog converter for generating the curve of FIG. 2 representing the function by Table I.

TABLE II

| X | Y | X | Y |
|---|---|---|---|
| 0 | 400 | 561 | 300 |
| 51 | 800 | 612 | 400 |
| 102 | 800 | 663 | 800 |
| 153 | 800 | 714 | 400 |
| 204 | 900 | 765 | 000 |
| 255 | 1000 | 806 | 000 |
| 306 | 800 | 857 | 000 |
| 357 | 600 | 908 | 100 |
| 408 | 200 | 959 | 100 |
| 459 | 200 | 1010 | 100 |
| 510 | 200 | | |

By successively coupling the values presented in Table II to the cathode ray tube deflection means, and by unblanking the cathode ray tube beam after it has been positioned at each point, a series of points in alignment with the curve of FIG. 2 will be presented on the cathode ray tube. By providing line drawing equipment, straight lines can be drawn between adjacent points to thus substantially duplicate the curve shown in FIG. 2. Although apparatus for drawing lines is known in the prior art, the provision of such apparatus in an actual system represents a considerable expense which could well make the entire system of FIG. 1 economically unjustified. By spacing the values of Table II closely enough so that the unblanked points displayed by the cathode ray tube are contiguous, the necessity of providing line drawing equipment can be avoided. However, when the information to be displayed is transmitted over telephone lines, the telephone line bandwidth limits the amount of information which can be provided to the operator positions in a unit time interval.

More particularly, if the display matrix includes 1024 abscissa points, ten binary digits (bits) are required to position the beam in the X-direction. Similarly, ten bits are required to represent the ordinate value. Thus, for each point to be displayed according to conventional techniques, 20 bits must be conveyed from the computer over the telephone line to the cathode ray tube device. Since 417 microseconds are ordinarily required to convey single bits of information, the rate at which all the operator positions could be serviced by the computer would be undesirably slow thereby considerably reducing the effectiveness of the system as an analysis tool for the scientist. If line drawing equipment is not to be used to connect points thus making it desirable that the transmitted points actually be overlapping, a much greater amount of data would have to be transmitted of course, making the servicing of each operator position even slower. In accordance with the present invention, a method and apparatus for presenting digital information representative of a function to be displayed, is disclosed which enables the computer to service the operator positions at a significantly greater rate. For example, whereas it has been seen that 20 bits are required to represent a single matrix display point, it will be shown that in accordance with the invention most display points can be represented by a single bit.

Figures 3, 4:
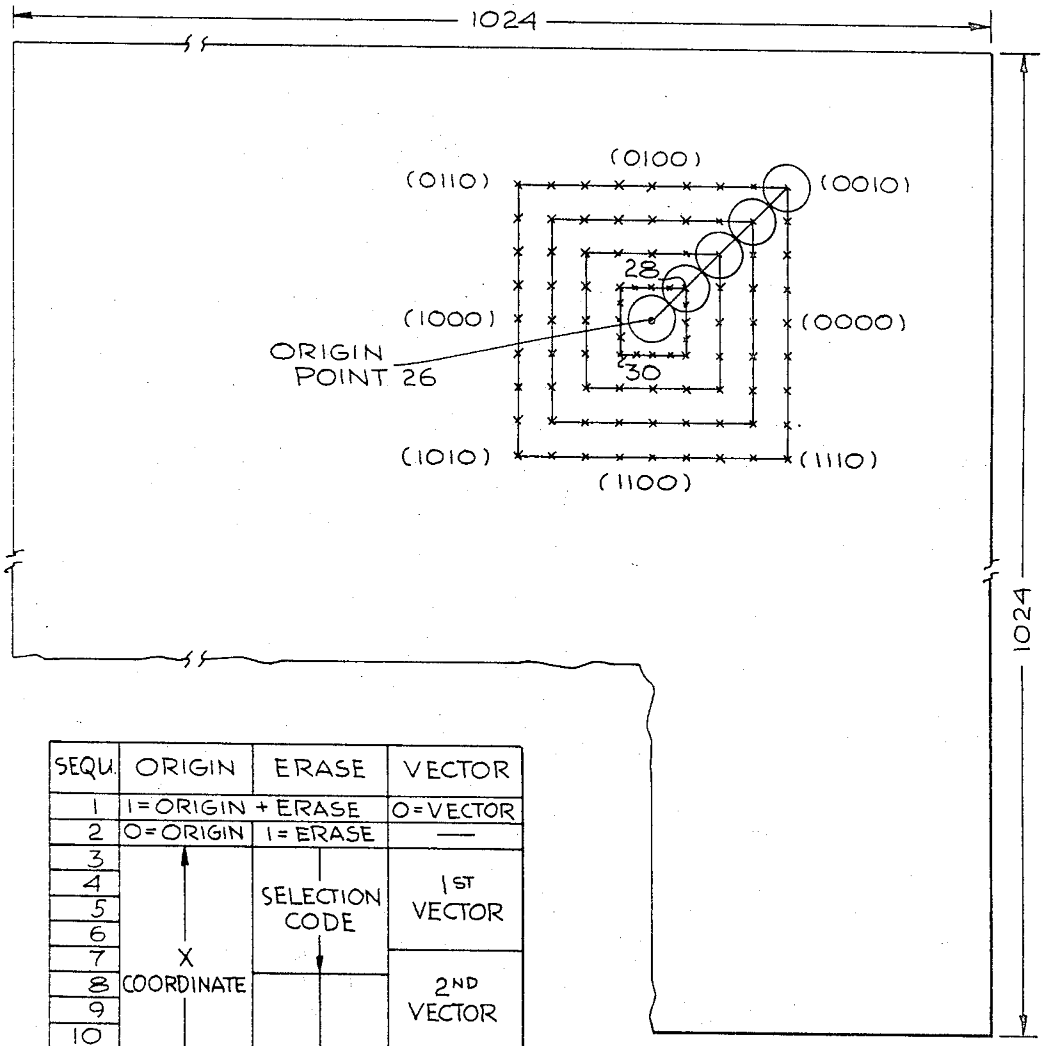
FIG. 3 is a diagram of a plurality of vectors each of which can be selectively chosen and coupled to form the curve of FIG. 2.
FIG. 4 is a diagram illustrating a representative digital word format which can be utilized in the system of FIG. 1.

Attention is now called to FIG. 3 which illustrates an origin point 26 displayed on an exemplary 1024 x 1024 display matrix. The origin point can comprise any point on a curve to be displayed and its position can be defined by 20 bits; i.e., ten bits to represent the X-coordinate and ten bits to represent the Y-coordinate. In accordance with the invention, the position of a subsequent point can be defined in terms of how the X and Y-coordinates of the origin point can be modified. More particularly, if the assumption is made that a subsequent point 28 will be coincident with one of the sixteen points on the perimeter 30 of a 5 x 5 matrix around the origin point as a center, the position of the subsequent point can be defined by only four bits. In very many real situations, this assumption does not visibly affect the accuracy of the displayed curve. If greater accuracy is desired of course, five bits for example can be used to permit the subsequent point to be positioned in any one of 32 positions. On the assumption that 16 positions will suffice, the four bit code associated with each position will either increment or decrement the X or Y-coordinates of the origin point by one or two or will leave it unchanged. In order to position the subsequent point as illustrated in FIG. 3, it would be necessary to increment both the X and Y-coordinates by two assuming conventional rectangular coordinate polarities.

In order to avoid the necessity of providing line drawing equipment, the 16 possible subsequent point positions should be chosen so that points displayed thereat will be contiguous with the origin point as shown in FIG. 3. It should thus be apparent how the positions of points on a curve can each be defined by four, rather than 20, bits once the position of an origin point has been defined. Recognizing that most curves can be made up of a series of short line segments or vectors strung end to end without sacrificing significant accuracy, the four bits can be used to define still an additional arbitrary number of points to thus create a vector. It will be assumed herein that each vector is comprised of four points meaning then that in the assumed system, only one bit is required to define each display point. In accordance with the invention of course vectors of any length can be employed. However as the vectors are made longer to reduce the amount of display information which must be transmitted, the curve displayed by the cathode ray tube will increasingly appear to the user to be composed of a plurality of straight lines connected together, which of course in fact it is. If the vectors are made shorter, more information must be transmitted to represent a curve but the curve can in most instances be represented more precisely.

FIG. 3 illustrates a four bit code word used to identify each of several of the 16 vectors, the initial vector along the X-axis in a positive direction being identified by the code word (0000) and subsequent vectors in a counter clockwise direction being identified by numerically succeeding code words. The code words required to define each of the vectors used to make up the curve of FIG. 2 are shown herein.

It is contemplated of course that the deflection techniques thus far discussed with respect to FIG. 3 will find principal application in cathode ray tube devices although it should be appreciated that they can be extended to other X–Y deflection apparatus, as for example, moving stylus devices. Although conventional cathode ray tubes require that a display be continually refreshed if it is to be maintained, storage type cathode ray tubes have recently become available which will maintain a display without refreshment until the display is erased. In order to avoid the need for refreshing displays, the cathode ray tube devices 24 of FIG. 1 will be assumed to be of the storage type. In order to display curves therefor, it is only necessary that three different command words be provided by the computer 10 to the operator position control unit 20. That is, an erase command word must be definable in order to clear a cathode ray tube. Secondly, an origin command word must be definable to designate the abscissa and ordinate of an origin point. Thirdly, a vector command word is required to designate vectors to be drawn from the origin point. Since the origin command word requires five bits to represent an operator position, assuming the system includes 32 such positions, and 20 bits to designate the origin point position, a word length of 28 bits will be assumed. FIG. 4 illustrates an exemplary command word format for the system of FIG. 1. The initial two bits in each command word identify the word as being either an erase, an origin, or a vector word. In the erase word, the succeeding five bits comprise a selection code identifying one of the plurality of operator positions. In the origin word, the 20 bits following the initial two bits identify the position of the origin point to be displayed on the display matrix. The succeeding five bits comprise a selection code identifying an operator position. The initial two bits in the vector word identify it as such. The succeeding bits are arranged in groups of four, each group identifying a different one of the 16 selectable vectors. Thus, each vector command word can identify six vectors which, as will be seen hereinafter, are sequentially processed to accordingly deflect the cathode ray tube beam.

The erase, origin and vector words are provided by the computer in a sequence determined by its stored program. Thus, when a new curve is to be displayed by a cathode ray tube device, an erase word can be initially provided including the selection code identifying that device. Then an origin word identifying the position of one point on the desired curve can be provided. Then vector words can be provided to draw the remainder of the curve. The vector words can be formed by the computer by, for example, determining the slope between adjacent function points.

Attention is now called to FIG. 5 of the drawings which illustrates a preferred implementation of the display portion of the operator position control unit 20 of FIG. 1. The data set equipment 18 of FIG. 1 provides a data line 50 and a sync pulse line 52 to the control unit 20. The bits of each of the command words shown in FIG. 4 appear serially on the data line 50 coincident with a pulse appearing on the sync line 52.

A state counter 54 is provided which is capable of defining a plurality of different states which control the operations to be performed on the incoming data. The states of the control counter are set forth in a flow diagram in FIG. 5(*d*). State $S_0$ identifies a rest state which is defined by the counter 54 between the transmission of command words. When data is not being transmitted on data line 50, the line is at a voltage level defining a binary "1" state. Immediately prior to the transmission of data, a "start" (binary "0") pulse is applied to the data line 50 which causes the state counter 54 to switch to state $S_1$. If the next bit appearing on the data line 50 comprises a "1" identifying either an origin or erase command word, the counter switches to state $S_3$. If the succeeding bit is also a "1," the erase word is indicated and the counter switches to state $S_2$ during which a selection register 56 is loaded with the selection code and the selected cathode ray tube device 24 is erased. After state $S_2$, the counter 54 is returned to state $S_0$. In the event an origin command word is defined, the counter switches to state $S_7$ from state $S_3$, during which state both the selection register 56 and the display register 58 are loaded. After these registers are loaded, the counter 54 is switched to state $S_5$ which transfers the contents of the display register 58 through digital-to-analog converters to the deflection means of the selected cathode ray tube device. After state $S_5$, state $S_6$ is defined which introduces a delay to allow for the cathode ray tube beam to settle at its newly defined position, prior to switching back to state $S_0$.

After state $S_1$, if a vector word is defined, the counter 54 switches to state $S_{13}$ during which a vector register 60 is cleared. Subsequently, during state $S_{12}$, the vector register 60 is loaded with four bits representing the initial vector. Subsequently, during state $S_{10}$, the contents of the vector register 60 are utilized to appropriately increment or decrement the contents of the display register 58. After state $S_{10}$, state $S_5$ is defined during which the beam is unblanked at its newly defined position. After state $S_5$, state $S_6$ is defined. Unless the four points of the vector presently being operated upon have already been drawn, the state counter 54 will return to state $S_{10}$ after state $S_6$. If the four points in the vector have been drawn, the counter will switch to state $S_{12}$ to enter the four bits of the succeeding vector in the same vector word, into the vector register 60. At the end of state $S_6$, after all four points of the sixth vector of a vector word have been drawn, the counter 54 can be switched back to state $S_0$. With the foregoing brief introduction of the operation of the display portion of the operator position control unit, the implementation thereof will now be considered in detail.

An And gate 62 is provided whose inputs are respectively connected to the state $S_0$ output terminal of the state counter 54, the sync pulse line 52, and through an inverter 64 to the data line 50. Thus, And gate 62 will provide a true output signal to shift the counter 54 to state $S_1$, when a "0" data bit appears when the counter 54 defines state $S_0$. When And gate 66 subsequently provides a true output signal, in response, to a "1" data bit indicating reception of an erase or origin word, the state counter is switched to state $S_3$. If the succeeding bit appearing on the data line 50 is a "0," thereby defining an origin word, gate 68 will switch the counter 54 to state $S_7$. On the other hand, if the second bit appearing on the data line 50 after the start pulse is a "1," thereby defining an erase word, gate 70 will switch the state counter 54 to state $S_2$.

Consider initially the arrival of an erase word meaning that state $S_2$ is defined. The state $S_2$ output terminal of the state counter 54 is connected to the input of Or gate 72 whose output is connected to the input of And gate 74. A second input to the And gate 74 is derived from the output of a clock pulse source 76 whose frequency is much greater than that of the sync pulses appearing on sync pulse line 52. A third input applied to the gate 74 comprises the false output terminal of a set-reset flip-flop 78. The output of gate 74 is connected to the set input terminal of flip-flop 78. Thus, if flip-flop 78 is initially in a false condition, as soon as state $S_2$ is defined, gate 74 will provide a true output pulse in response to the first clock pulse provided by source 76 to thus switch the flip-flop 78 to a true state. The true output terminal of flip-flop 78 is connected to the input of And gate 80 along with the state $S_0$ output terminal of counter 54. The output of gate 80 is connected to the reset input terminal of flip-flop 78. Thus, flip-flop 78 will not be reset until state $S_0$ is defined. The true output pulse provided by And gate 74 is coupled to the input of an Or gate 82 whose output is connected to the data input terminal of the selection register 56. Thus, a "1" bit can be entered into the register 56 as soon as state $S_2$ is defined and prior to the data bits of the selection code arriving on data line 50. In addition the output of gate 74 is connected to the "clear" terminals of both the selection register 56 and the display register 58. The application of a true signal to the "clear" terminal of register 56 clears all positions thereof but however permits the "1" bit to be written into the first position thereof.

A second input to the Or gate 82 is derived from the output of And gate 84 whose inputs are connected to the sync pulse line 52 and data line 50. A third input to the And gate 84 is derived from the output of Or gate 86. The state $S_2$ output terminal of counter 54 is applied to the input of gate 86.

The selection register 56 comprises a shift register which shifts its contents one position to the right in response to each sync pulse appearing on line 52. Thus, each succeeding bit of the selection code of the erase word will be entered into the selection register 56 coincident with occurrence of a sync pulse. The "1" bit entered prior to the selection code bits will be shifted through the register 56 and will appear at the output of the register as soon as the register is fully loaded. The output of register 56 is connected to the input of And gate 87 along with the state $S_2$ output terminal of counter 54. The output of gate 87 initiates the operation of an erase means 88 which provides an erase pulse to the cathode ray tube device identified by the selection code in the register 56. More particularly, as can be seen in FIG. 5(*b*), the output of the selection register 56 is applied to a decoder circuit 90 which has a plurality of output terminals, each corresponding to a different one of the cathode ray tube devices. Each of these output terminals is connected to the input of a different gate 92 whose outputs are respectively connected to the erase input terminal of a different one of the cathode ray tube device. The output of the erase means 88 is connected to the input of each of the gates 92.

The output of previously referred to gate 87 is also connected to the state counter 54 to drive it to state $S_0$ when gate 87 provides a true output signal. Accordingly, it has been shown how a selected cathode ray tube device 24 can be erased in response to the appearance of an erase word on the data line 50.

In response to an origin word, state $S_7$ will be defined after state $S_3$ as previously noted. The state $S_7$ output terminal of counter 54 is connected to the input of Or gate 72 to thus enter a "1" bit immediately prior to the bits of the origin word appearing on the data line 50. The output of the selection register 56 is connected to the input of the display register 58. Thus, all the bits of the X and Y-coordinates will be shifted into the display register 58 and all the bits of the selection code into the selection register 56 prior to the initial "1" bit appearing at the output of the register 58. The output of the register 58 is connected to the input of And gate 94 whose second input is derived from the state $S_7$ output terminal of the state counter 54. The output of gate 94 is connected to the state counter to drive it to state $S_5$. The outputs of the X and Y-coordinate portions of the register 58 are respectively connected to the input of And gates 96 and 98. Second and third inputs to each of And gates 96 and 98 are derived from the clock pulse source 76 and the state $S_5$ output terminal of the counter 54. The outputs of gates 96 and 98 are respectively applied to the inputs of storage type digital-to-analog converters 100 and 102 which develop analog signals which are applied to all of the cathode ray devices. Thus, during state $S_5$, the beams of all the cathode ray tube devices are deflected to corresponding display positions identified by the information loaded into the display register 58. An And gate 108 is provided which is responsive to the clock pulse and state $S_5$ defined by the counter 54 for driving the counter to define state $S_6$.

During state $S_6$, a delay monostable multivibrator 109 is set to its unsatble condition to introduce a time delay to allow the beams to settle in their new positions. After the multivibrator 109 returns to its stable state, a pulse is provided which energizes a beam unblanking means 110 to unblank the beam in the selected cathode ray tube device through gating means 112 controlled by decoding means 90 responsive to the display register 58. In addition, the multivibrator pulse switches the counter 54 back to state $S_0$ through gate 114. In the event a vector word was being operated upon, the counter 54 could be switched from state $S_6$ to either states $S_{10}$ or $S_{12}$, as will be more apparent hereinafter, if display points remain to be drawn.

In response to a vector word appearing on the data line 50, state $S_{13}$, as aforedescribed, will be defined after state $S_1$. During state $S_{13}$, And gate 120 will provide a true output signal to the set input terminal of flip-flop 122 in response to the initial clock pulse provided by source 76 subsequent to state $S_{13}$ being defined. The output of gate 120 in addition is connected to the input of Or gate 124 and to the "clear" input terminal of register 60. The output of gate 124 is connected to the data input terminal of register 60. Thus when gate 120 provides a true output signal, it causes an initial "1" to be written into the first stage of vector register 60 and the rest of the register to be cleared. In addition, the output of gate 120 drives put signal, it causes an initial "1" to be written into the counter 54 to state $S_{12}$. During state $S_{12}$, the succeeding four bits appearing on the data line 50 are coupled through And gate 126 and gate 124 into the vector register 50. When four bits have been loaded therein, the initial "1" will appear on the output line of the register 60 and be applied to the input of And gate 128 which is enabled during state $S_{12}$ to thus switch the state counter 54 to state $S_{10}$. During state $S_{10}$, the contents of the display register 58 are incremented or decremented in accordance with the four bits stored in the vector register. That is, it will be recalled that from an origin point, defined by the contents of the display register 58, the X- and Y-coordinates are either left unchanged, or incremented or decremented by one or two, FIG. 5(*c*) illustrates the preferred implementation for modifying the contents of the display register in accordance with the four-bit vector codes stored in the vector register.

Attention is now called to FIG. 5(*c*) which illustrates the details of a preferred means of modifying the contents of the display register in accordance with the vector information stored in the vector register 60. A decoder circuit 130 is provided which is responsive to the contents of the vector register 60. The decoder 130 has eight output terminals which, in combination, indicate how the X- and Y-coordinates stored in the display register should be modified. More particularly, four terminals are associated with the X-coordinate; i.e., terminals 132 and 134 are used to respectively indicate whether the X-coordinate should be modified by one or two counts and terminals 136 and 138 are used to respectively indicate whether the X-coordinate should be incremented or decremented. Four terminals are similarly associated with the Y-coordinate. Terminals 140 and 142 are used to respectively indicate whether the Y-coordinate should be modified by one or two counts and terminals 144 and 146 are used to respectively indicate whether the Y-coordinate should be incremented or decremented.

A binary number can be incremented by one by adding "1" to the least significant digit thereof and propagating carries to the more significant digits where necessary. In order to increment a binary number by two, a binary "1" can be added to the second least significant digit thereof with carries being propagated to the more significant digits where necessary. A binary number can be decremented in a similar manner by utilizing different rules with respect to the propagation of carries. Thus, a binary number can be decremented by one by subtracting "1" from the least significant digit of the number. The sum of and difference between two binary digits can be formed in a half adder circuit. When adding, a carry is developed when both digits being added are "1" and when subtracting a carry (preferably called a "borrow") is developed when the subtrahend digit is a "1" and the numerant digit is a "0." A binary number can be decremented by two by subtracting a binary "1" from the second least significant digit of the number.

The contents of the display register are modified by shifting the bits thereof in sequence through a half adder circuit 150. The contents of the display register are shifted in response to pulses provided by an And gate 151 whose inputs are connected to the state $S_{10}$ output terminal of counter 54 and to the output of clock source 76. The output of And gate 151 is in addition connected to the input of a scale of twenty counter 152 which is incremented by one count each time the display register is shifted. The contents of the display register are modified by applying appropriate carry or borrow digits to the half adder circuit 150 simultaneously with the application of the bits from the display register.

Initially consider the situation when the code in the vector register develops a true output signal on decoder output terminals 132 and 138 meaning that the X-coordinate is to be incremented by one. The output terminal 132 of the decoder circuit 130 is connected to the input of an And gate 154 whose output is connected to the input of an Or gate 156. A second input to the And gate 154 is derived from the state $S_{10}$ output terminal of counter 54. Gate 154 is enabled when counter 152 defines a count of one. Output terminal 138 of decoder circuit 130 will provide a true signal to the input of And gate 160 which is enabled during counts one through ten as defined by counter 152. The output of gate 160 is connected to the input of Or gate 162. The output of Or gate 162 is connected to the input of And gate 164 which, in addition, receives inputs from the output of the display register 58 and the Or gate 156. The output of gate 164 is connected to the input of Or gate 166 which is connected to the set input terminal of a carry/borrow flip-flop 168. When count one is defined by the counter 152, the least significant bit of the X-coordinate will be applied to the half adder 150 along with a "1" bit from the Or gate 156. Similarly, Or gate 162 will provide a "1" output signal. If the least significant bit of the X-coordinate is a "0," the half adder 150 will provide a "1" output and And gate 164 will not be enabled. On the other hand, if the least significant bit of the X-coordinate is a "1," the half adder circuit 150 will provide a "0" sum output but however the And gate 164 will be enabled to set the flip-flop 168. The true output of flip-flop 168 is connected to the input of Or gate 156 so that when the next bit is shifted out of the register 58, a carry or "1" bit will again be applied to the half adder circuit 150. Thus, the carry will be propagated so far as necessary to increment the X-coordinate by one. The flip-flop 168 will be reset by the output of And gate 170 in response to the first clock pulse when the Or gate 166 does not simultaneously provide a signal setting the flip-flop.

When the X-coordinate is to be decremented by one, the output terminal 132 is still made true but in lieu of the output terminal 138 being true, output terminal 136 is true to thus cause Or gate 163, rather than Or gate 162, to provide a true output signal. The output of Or gate 156 is connected to the input of And gate 165 along with the complementary output of the display register 58. The output of the display register 58 is complemented by inverter 172. The output of And gate 165 is connected to the input of Or gate 166. Thus, when the X-coordinate is being decremented, the flip-flop 168 will be set to introduce a borrow when the output of the display register 58 is a "0" and the output of the Or gate 156 is a "1."

Incrementing or decrementing by two is accomplished in the same manner as incrementing or decrementing by one except however that instead of And gate 154 introducing a carry during count one as defined by the counter 152, And gate 174 introduces the carry when count two is defined. Carries and borrows are then propagated through the more significant digits in the same manner as when incrementing or decrementing by one.

The Y-coordinate is similarly incremented or decremented except however that the And gates 176 and 178 to which the Y-coordinate control terminals 144 and 146 are connected, are enabled during counts 11 through 20 which define the periods during which the bits of the Y-coordinate are being applied to the half adder circuit 150 by the display register. Similarly, in order to increment or decrement the Y-coordinate by one, a carry or borrow is introduced to the half adder during count 11 by And gate 180 and during count 12 by And gate 182 in order to increment or decrement the Y-coordinate by two.

An Add gate 184 is provided which is responsive to the counter 152 defining a count of 20 and to State $S_{10}$ being defined by the counter 54. When And gate 184 is enabled, the counter 54 is driven to state $S_5$ and in addition a display point counter 186 is incremented. The display point counter 186 is a scale of four counter which is used to cause the display register to be cycled four times for each vector code of four bits stored in the vector register 60. A vector counter 188 is provided which is incremented in response to each cycle of the point counter 186, meaning that all four points of a given vector have been drawn. This vector counter 188 determines when all six vectors of a given vector word have been completed.

As previously noted, during state $S_5$, the contents of the display register are applied to the digital-to-analog converters 100 and 102 and thence to the cathode ray tube devices to deflect the beam to the defined display coordinate. Subsequently, state $S_6$ is defined to unblank the beam of the selected cathode ray tube device. After state $S_6$, if the display point counter 186 defines any count other than four, meaning of course that the four points of a vector have not yet been completely drawn, the state counter 54 will be driven back to state $S_{10}$ to increment the X and Y-coordinates in the display register again by the same information in the vector register. Thus, by cycling the contents of the display register four times for each vector, four display points will be made to appear on the face of the selected cathode ray tube device. As previously noted, these display points are caused to overlap to thus create a continuous line.

If, at the end of state $S_6$, the point counter 186 defines a count of four but the vector counter 188 defines a count less than six, it means that a further vector from the same vector word being processed must be entered into the vector register. Thus, under these conditions, And gate 190 is enabled to drive the state counter 54 to state $S_{12}$ to thus load the vector register 60. Accordingly, it should now be apparent how the apparatus of FIG. 5 is utilized to display four points for each of six vectors defined by a vector word whose bits appear serially on the data line 50. It should be realized that all four points of each of the vectors are drawn between the time the fourth bit of one vector is received and the first bit of a subsequent vector. Inasmuch as data bits are provided by the telephone line at a rate of only about one every 400 microseconds, it is relatively easy to cycle the contents of the display register four times between the reception of adjacent bits of the vector word.

From the foregoing, it should be realized that an improved system has been provided herein for representing positional information such that the information can be transmitted over a narrower bandwith transmission system than has heretofore been required. Such positional information finds particular utility in conjunction with cathode ray tube display devices for drawing continuous curves but in addition is very useful in other X–Y positioning mechanisms, e.g., digital plotters, and for drawing other data, e.g., alphanumeric symbols. A system constructed in accordance with teachings of the invention finds significant utility in multi-user computer system in which the users may be located remote from a central processing facility and in communication therewith by a relatively narrow bandwidth communication system, e.g., a telephone line.

The embodiments of the invention in which an exclusive property or privilege is claimed are defined as follows.

We claim:

1. In a system including a matrix of MN points and an element adapted to be sequentially moved between points of said matrix:

a register for storing digital information identifying one of said MN points in said matrix and a submatrix of M'N' points where $M>M'$ and $N>N'$;

a decoding means responsive to said digital information in said register for moving said element to the point identified thereby;

a source means for providing digital information for identifying a point in said identified submatrix; and means for modifying said digital information stored in said register in accordance with said digital information provided by said source means to identify a second of said MN points.

2. In combination with a matrix including MN points and a positionable means adapted to be positioned at any one of said points;

a register for storing digital information identifying both a first of said MN points and a portion of said matrix comprised of X points where $MN>X$;

source means for providing digital information for selectively identifying a point in said portion of said matrix;

means responsive to said information provided by said source means for modifying said digital information stored in said register to thereby identify a second one of said MN points; and means responsive to said digital information stored in said register for positioning said positionable means at the matrix point identified thereby.

3. A display system comprising:

a cathode ray tube having a target thereon comprised of a matrix of points;

means in said cathode ray tube for generating an electron beam;

a storage register;

means responsive to information stored in said storage register for deflecting said electron beam to one of said matrix points;

a source means providing first and second words;

said first words including information identifying one of said matrix points and a subportion of said matrix and said second words including information identifying one of a plurality of points in said identified subportion of said matrix;

means responsive to the provision of said first words for storing the information therein in said storage register for deflecting said beam to the matrix point thus identified; and means responsive to the provision of said second words for modifying the information in said storage register for deflecting said beam to the matrix point thus identified.

4. A display system comprising:

a cathode ray tube having a target thereon comprised of a matrix of M columns and N rows;

means in said cathode ray tube for generating an electron beam;

a storage register including vertical and horizontal deflection information portions;

means responsive to information stored in said vertical and horizontal deflection information portions for respectively deflecting said beam to one of said M columns and one of said N rows;

a source means providing first and second words;

said first words including information identifying one of said M columns and one of said N rows, said second words including information identifying one of a plurality of points in a submatrix in terms of the point's incremental distance from a reference point in said submatrix;

means responsive to the provision of said first words for storing the information therein in said storage register; and means responsive to the provision of said second words for incrementing the information in said storage register in accordance with the incremental distance between the submatrix point identified thereby and said submatrix reference point.

5. A computing and display system comprising:

a computer;

a display device;

a communication channel coupling said computer to said display device;

said display device comprising a matrix of MN display points, a positionable display means, and deflection means for deflecting said display means to selected points in said matrix;

said computer including means for applying origin point information to said communication channel identifying a first point in said matrix;

a display storage register connected to said communication channel for storing said origin point information;

said deflection means responsive to said information stored in said display storage register for deflecting said display means to the matrix point identified thereby;

said computer including means for applying vector information to said communication channel identifying a second point in said matrix; and means responsive to said vector information for modifying said information stored in said display storage register.

6. The system of claim 5 where said display device comprises a cathode ray tube and said positionable display means comprises an electron beam; and means for unblanking said beam at each matrix point identified by information stored in said display storage register.

7. A computing and display system comprising:

a computer;

a display device;

a communication channel coupling said computer to said display device;

said display device comprising a matrix of MN display points, a positionable display means, and deflection means for deflecting said display means to selected points in said matrix;

said computer including means for applying origin point information to said communication channel identifying a first matrix point in terms of its abscissa and ordinate values in said matrix;

a display storage register connected to said communication channel for storing said origin point information;

said deflection means responsive to said information stored in said display storage register for deflecting said display means to the matrix point identified thereby;

said computer including means for applying vector information to said communication channel identifying a second matrix point in terms of its abscissa and ordinate distances from the point identified by the information stored in said display storage register;

a vector storage register connected to said communication channel for storing said vector information; and arithmetic means for incrementing or decrementing said information stored in said display storage register in accordance with said information stored in said vector storage register.

8. The system of claim 7 including means for repeatedly operating said arithmetic means to modify said information stored in said display storage register a plurality of times to thereby define a plurality of matrix points along a straight line.

9. The system of claim 8 wherein said display device comprises a cathode ray tube and said positionable display means comprises an electron beam; and means for unblanking said beam at each matrix point identified by the information stored in said display storage register to display a point at each of said matrix points along a straight line, said displayed points being sufficiently large so as to overlap one another.

10. A computing and display system comprising:

a computing station;

an operator station;

a communication channel coupling said computing station to said operator station;

said operator station including a display device comprising a matrix of MN display points, a positionable display means, and deflection means for deflecting said display means to selected points in said matrix;

said computing station including means for applying to said communication channel an origin word comprised of a plurality of digits and including a position portion identifying a first matrix point in terms of its abscissa and ordinate values in said matrix;

a shift register having an output terminal and an input terminal connected to said communication channel for storing said position portion of said origin word;

said deflection means being selectively actuatable to respond to said information stored in said shift register for deflecting said display means to the matrix point identified thereby;

said computer including means for successively applying vector codes to said communication channel, each vector code identifying a matrix point in terms of its abscissa and ordinate distances from a previously identified matrix pont;

a vector register connected to said communication channel for receiving and storing at least one of said vector codes;

an arithmetic means having first and second input terminals and an output terminal;

means for shifting the information stored in said shift register and for serially applying the digits appearing at the output terminal thereof to said first arithmetic means input terminal;

logic circuit means responsive to said vector code stored in said vector register for applying digits to said second arithmetic means input terminal in synchronism with said digits spplied by said shift register; and means for coupling said arithmetic means output terminal to said shift register input terminal.

11. The system of claim 10 including means for cyclically shifting said information stored in said shift register through said arithmetic means; and means for actuating said deflection means once for each cycle of said shift register.

12. The system of claim 11 wherein said vector codes successively applied to said communication channel are successively stored in said vector register; and wherein said information stored in said shift register is cyclically shifted through said arithmetic means while one of said vector codes is stored in said vector register and prior to a subsequent vector code being entered therein.

13. The system of claim 10 including a plurality of operator stations and wherein each of said origin words includes selection digits identifying one of said stations.

References Cited

UNITED STATES PATENTS

| | | | |
|---|---|---|---|
| 3,037,192 | 5/1962 | Everett | 340—172.5 |
| 3.098,119 | 7/1963 | Lemelson | 178—6.8 X |
| 3,242,470 | 3/1966 | Hagelbarger et al. | 340—172.5 |
| 3,256,516 | 6/1966 | Melia et al. | 340—172.5 |
| 3,299,418 | 1/1967 | Treseder | 178—6 X |
| 3,307,156 | 2/1967 | Durr | 340—172.5 |

OTHER REFERENCES

Chu: Digital Computer Design Fundamentals, 1962, page 369, McGraw-Hill publishers.

ROBERT C. BAILEY, *Primary Examiner.*

P. R. WOODS, *Assistant Examiner.*